(12) United States Patent
McGrath, Jr.

(10) Patent No.: US 11,441,275 B2
(45) Date of Patent: Sep. 13, 2022

(54) SAFETY SURFACE MATERIALS

(71) Applicant: William H. McGrath, Jr., Whiting, NJ (US)

(72) Inventor: William H. McGrath, Jr., Whiting, NJ (US)

(*) Notice: Subject to any disclaimer, the term of this patent is extended or adjusted under 35 U.S.C. 154(b) by 0 days.

(21) Appl. No.: 16/133,878

(22) Filed: Sep. 18, 2018

(65) Prior Publication Data
US 2020/0087869 A1  Mar. 19, 2020

Related U.S. Application Data

(63) Continuation-in-part of application No. 15/011,927, filed on Feb. 1, 2016, now abandoned.

(51) Int. Cl.
| | |
|---|---|
| *E01C 13/00* | (2006.01) |
| *E01C 13/06* | (2006.01) |
| *B32B 27/14* | (2006.01) |
| *B32B 25/08* | (2006.01) |
| *B32B 5/16* | (2006.01) |
| *B32B 5/18* | (2006.01) |
| *B32B 27/06* | (2006.01) |
| *E01C 13/08* | (2006.01) |
| *E01C 11/24* | (2006.01) |
| *B32B 27/32* | (2006.01) |

(52) U.S. Cl.
CPC .............. *E01C 13/065* (2013.01); *B32B 5/16* (2013.01); *B32B 5/18* (2013.01); *B32B 25/08* (2013.01); *B32B 27/065* (2013.01); *B32B 27/14* (2013.01); *B32B 27/32* (2013.01); *E01C 11/24* (2013.01); *E01C 13/08* (2013.01); *B32B 2264/0257* (2013.01); *B32B 2305/022* (2013.01); *B32B 2307/51* (2013.01); *B32B 2307/542* (2013.01); *B32B 2307/554* (2013.01); *B32B 2307/71* (2013.01); *B32B 2307/712* (2013.01); *B32B 2307/714* (2013.01); *B32B 2307/718* (2013.01); *B32B 2307/734* (2013.01); *B32B 2307/744* (2013.01)

(58) Field of Classification Search
CPC .......... E01C 3/003; E01C 11/24; E01C 13/02; E01C 13/08
USPC ....................................................... 404/27, 32
See application file for complete search history.

(56) References Cited

U.S. PATENT DOCUMENTS

| | | | | |
|---|---|---|---|---|
| 3,443,493 A | * | 5/1969 | Del Piano | E01C 13/12 472/90 |
| 3,816,234 A | * | 6/1974 | Winfield | B32B 27/08 4/234 |
| 5,472,743 A | * | 12/1995 | Daluise | E01C 19/45 427/136 |
| 5,514,722 A | * | 5/1996 | Di Geronimo | C08L 9/00 404/32 |
| 5,605,721 A | * | 2/1997 | Di Geronimo | C08L 9/00 156/330.9 |
| 5,618,131 A | * | 4/1997 | Weber | E01C 13/08 404/32 |

(Continued)

*Primary Examiner* — Gary S Hartmann
(74) *Attorney, Agent, or Firm* — Charles I. Brodsky; Anthony Santangelo; Peter D. Mlynek

(57) ABSTRACT

A safety surface material for a playground facility employing a monolithically mixed and troweled Thermoplastic Olefin (TPO) polypropylene/polyurethane cushion course base layer—which, for water park/spray park use is overlain by a Thermoplastic Rubber wear course top.

12 Claims, 2 Drawing Sheets

(56) References Cited

U.S. PATENT DOCUMENTS

| | | | | |
|---|---|---|---|---|
| 6,159,550 | A * | 12/2000 | Daluise | E01C 19/45 |
| | | | | 427/136 |
| 6,491,991 | B2 * | 12/2002 | Seaton | D04B 21/04 |
| | | | | 428/17 |
| 6,702,514 | B2 * | 3/2004 | Kaneko | E01C 5/22 |
| | | | | 404/82 |
| 7,244,477 | B2 * | 7/2007 | Sawyer | E01C 13/02 |
| | | | | 428/17 |
| 7,943,213 | B2 * | 5/2011 | Weber | E01C 13/08 |
| | | | | 428/17 |
| 8,962,750 | B2 * | 2/2015 | Saluti | C08G 18/10 |
| | | | | 428/317.1 |
| 10,119,223 | B2 * | 11/2018 | Glaze | C09D 175/08 |
| 10,793,709 | B2 * | 10/2020 | Zhang | C08L 33/06 |
| 11,098,219 | B2 * | 8/2021 | Zhang | C09D 175/04 |
| 2017/0215503 | A1 * | 8/2017 | McGrath, Jr. | B32B 27/32 |

* cited by examiner

SAFETY SURFACE MATERIALS

CROSS-REFERENCE TO RELATED APPLICATIONS

This is a Continuation-in Part of application Ser. No. 15/011,927 filed Feb. 1, 2016.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX NOT APPLICABLE

BACKGROUND OF THE INVENTION

Field of the Invention

This invention relates to safety surface materials for playgrounds and water parks, in general, and to such surface materials as are "environmentally friendly", in particular.

Description of the Related Art

As will be appreciated, playground-themed recreational facilities are required to satisfy prescribed safety regulations which are not applicable to such water-themed recreational facilities as spray parks. Specifically, the playground facility surfaces are required to meet recognized standards including those issued by the American Society For Testing And Materials (ASTM) which establish play area requirements for children ages 2 and over, and which cover separate play areas within a site for specific age groups—but not the water park/spray park facility surfaces Such standards typically establish three criteria that need to be addressed to assess functionality: a) the force of impact from a fall in a use zone in and around playground equipment; b) the accessible routes in and around the playground equipment designed for circulation around the equipment and on whose surfaces it is predicted that a user would land when falling from or exiting pertinent play structures or equipment; and c) the surface characteristics of playground surfaces that allow for compaction, propulsion and turning capabilities for mobility devices on playground surfaces.

As will be understood, this has given rise to different specifications for different types of playground surfacing materials, such as: loose fill; pea gravel, sand and wood chips; shredded rubber and engineered wood fiber—and such fully accessible surfaces as pour-in-place rubber mats/tiles, and artificial grass with rubber in-fill.

As will be recognized by those skilled in the art, those safety surfaces installed by schools, parks or cities that are investing in a new playground, commonly employ a cushioned course or base surface layer, overlain by a wear course layer to keep safety, accessibility and user integration in mind. Comparisons are nevertheless often made between the consideration of the cost of installation and maintenance and the height of the equipment and the ages of the users, together with the amounts of their use. Less considerations have been observed to be given to the life expectancy of the surface and infill materials, and to the dispersion of accessible elements of the safety surfaces—and substantially little consideration has been given to the implementation of such surfaces in water splash park and spray park constructions.

Most playgrounds installed today utilize a wear course layer of granulated synthetic vulcanized rubber Ethylene Propylene Diaene Monomer (EPDM) over a cushion course layer of Styrene Butylene Rubber (SBR) formed of recycled, ground-up tire particles bound together with a polyurethane binder. Experience has shown, however, that these EPDM rubber pieces break down relatively fast under ultraviolet light—to the extent of even turning "white" within just a few weeks of placement. With available sunlight tending to break down the rubber itself, the associated surface then becomes brittle, leading to quick disintegration. In playground areas, the usual "fix" is just to sweep away the broken pieces and resurface the area every few years. Alternatively, a spraying may be done with a pigmented urethane every 1-2 years, with the urethane having various rubber fines in it in an attempt to bind the surface back together. Using trowels and lubricating solvents to smooth the repaired surface quickens the breakdown process, however, as the EPDM granules are attacked by the types of sprays employed. With these vulcanized rubber pieces being totally unrecyclable, the disintegrated pieces can only be trucked to a landfill and dumped. But, as important as this may be, maintenance of these surfaces are sparse, and surface conditions are allowed to deteriorate over time. And, the same breakdowns under environmental conditions have been known to exist with the SBR underlying base layer.

Moreover, serious concerns have also been raised as to adverse "health considerations" associated with the employment of the Styrene Butylene Rubber as the cushioning course base. Such concerns as to its relationship to "asthma", for example, have even prompted the ripping up of installed playgrounds in England to get rid of the SBR, and to no longer use it—using instead a foam mat underneath. But experience has shown that such substitution has led to problem of its own, as the mats tend to shrink and expand with temperature changes, worsening over time, tearing the wear layer, and any grass or artificial turf installed on top of that.

In any respect, depending upon use, and the type of playground equipment set up (be it swings, monkey bars, seesaw tetter-totters, or whatever) the SBR base employed is commonly anywhere from 2"-4" thick, with the overlying EPDM layer typically some ¾" thick. For an 8 foot drop height with a G-Force of some 200 or less, a 3" thick SBR cushion has generally been accepted as the ASTM standard—with increasing thicknesses being required for greater drop height satisfactions.

While "drop heights" and "G-Force" standards have not been established with respect to water parks and spray parks, investigation and research has revealed that many instances of injury have been sustained there through falls of children running and jumping along its wet surfaces. The employment of a granulated synthetic rubber surface of EPDM is not generally recommended there—as besides being light sensitive, such surfaces are not chlorine resistant, but break down just as they do through exposure to ultraviolet sunlight. Furthermore, the use of Styrene Butylene Rubber has been determined to be of limited use in that environment also, as the constant wetness experienced at these recreational facilities similarly erodes the rubber tire particles over time. In such regard, however, is a savings grace of the water-themed recreational facility not being exposed to an insurance company defense that drop height standards were not met when sued for injuries suffered by nature of falls at playground locations where the surface has deteriorated. As to this, it will be understood by those skilled in the art that an insurance company typically in answering a claim on a playground fall first proceeds by having tests run to see if the drop height/G-Force standard was maintained—and if not, disclaiming the defense of, and liability assumption of, a defendant then being sued by virtue of such circumstances.

OBJECTS OF THE INVENTION

It is an object of the present invention to provide a new and improved safety surface material for use in playground constructions and installations.

It is an object of the invention, also, to provide such a safety surface material which can also serve as a safety surface material for water parks and spray parks.

It is an object of the invention, additionally, to provide these safety surface materials of a less expensive nature than those associated with the construction and maintenance of prior art surfaces—while, at the same time, offering enhanced benefits against fall and sliding injuries of the kinds previously associated at these locations.

And, it is yet a further object of the invention to provide a safety surface material of this type which, by itself, is recyclable after use.

SUMMARY OF THE INVENTION

As will become clear from the following description, the safety surface materials of the present invention incorporate a monolithically mixed and trowelable thermoplastic foamed thermoplastic olefin cushion course base layer and urethane binder layer overlain by a thermoplastic rubber wear course top layer that is light stable, and for water use is also chlorine resistant.

DETAILED DESCRIPTION OF THE INVENTION

Figure 1:
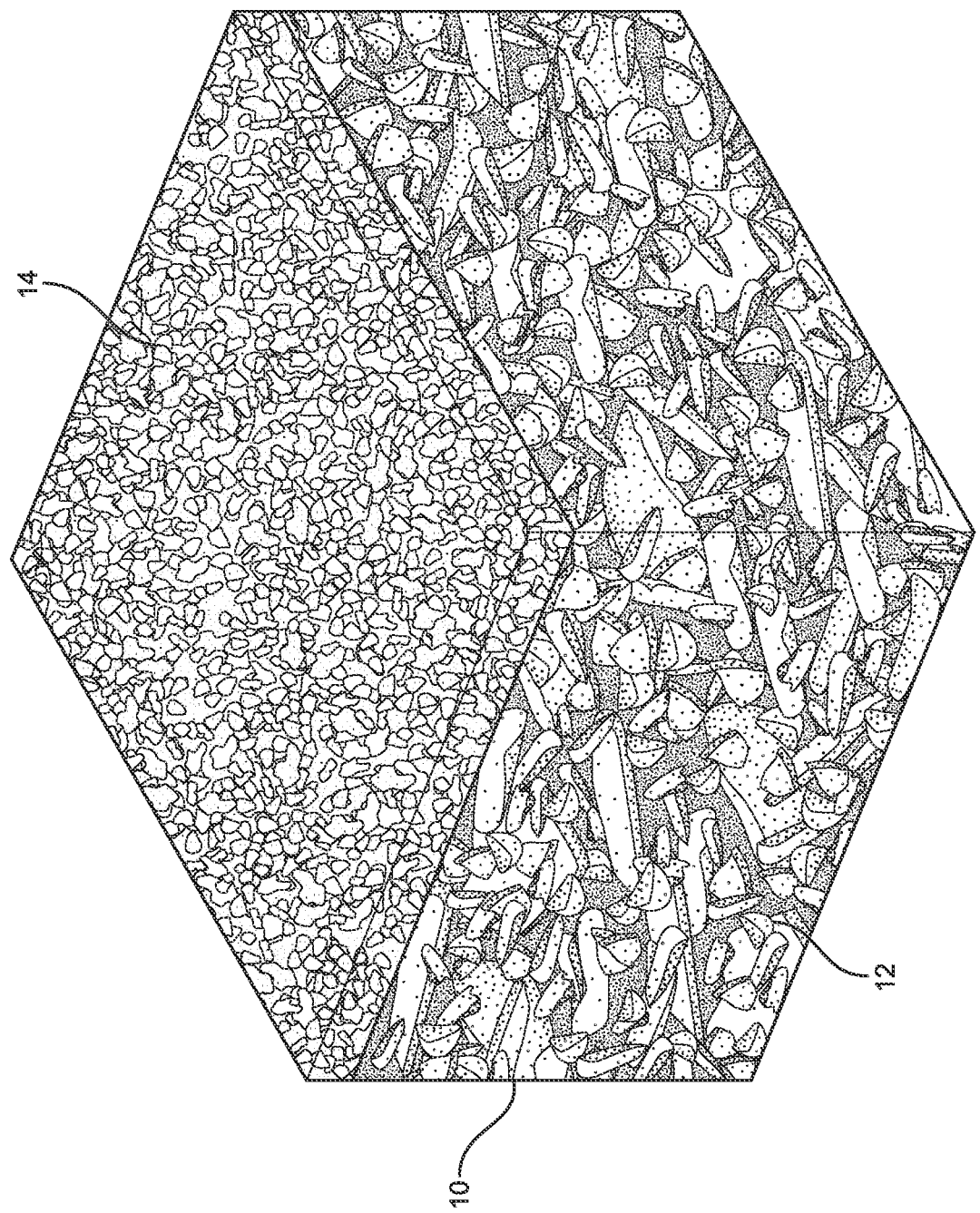
FIG. 1 is a block diagram helpful in an understanding of the safety surface materials of the invention.
Figure 2:
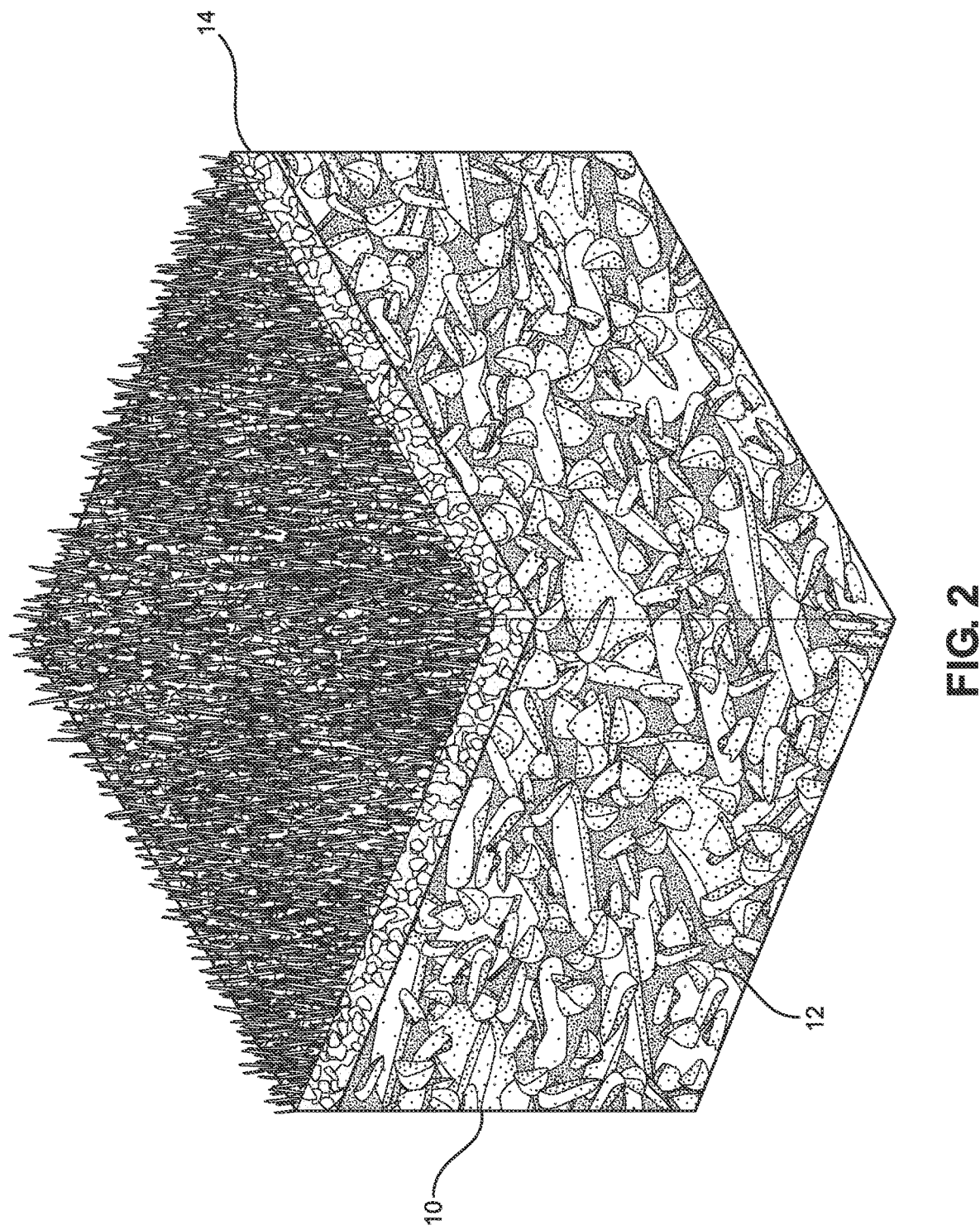
FIG. 2 is a diagram showing a reactional facility surfacing material comprising a cushion course base layer, a wear top course layer, and a synthetic turf.

As will be appreciated, one of the more developing recreational facilities of late has been the construction of water parks—and particularly water spray parks in large facilities likened in size to commercial malls. Recognizing that some things other than bare concrete is needed on which kids and children run about, EPDM layers have been proposed, and are being utilized, instead as a covering material. Problems with these granulated synthetic rubber surfaces have been recognized, however, as in US Patent Application Publication 2005/0245681—which proposed instead a formulation termed "Pebble-Flex" as an alternative usage. As its name implies, however, the formulation employed a composition in the form of "pebbles" which by their rounded-type appearance provided a limited ability to join in contact with one another. As a result, its advantages diminished over time, permitting sliding and hydroplaning as the kids and children ran about, especially when the surfacings were very wet.

Appreciating, furthermore, the need to maintain the active surface as being light stable, unaffected by ultraviolet light, as well as chlorine resistant, it goes without saying that any substitute surfacing exhibiting these characteristics, should also not degrade or readily break off, but have a meaningful life.

Forward thinking, as with the present invention, led to the conclusion that overall protection should be had, more than just dealing with such minor matters as bruised and scraped bodies, arms and legs when sliding or falling. Although recognizing that ASTM type standards have not so far been determined to apply to water and spray park operations, the present invention proceeds upon the benefits of these standards being satisfied as well.

Thus, in accordance with the present invention, a new and improved cushion course base layer is developed for use both at playgrounds and at water parks and spray parks. Such layer consists of a thermoplastic foamed thermoplastic olefin, mixed with a urethane binder. By becoming a foamed monolithic surface which is trowelable, one advantage of it is that it does not shrink over time; another is that it is not needed to be put down in individual mats which can later sift and crack at their seams—and thus does not suffer those disadvantages of the prior art. Additionally, a comparable degree of protection as with Styrene Butylene Rubber is provided, yet with a thinner layered surface in a significant cost savings. (An SBR cushion for an HIC of 1000 with a G-Force of 200 that meets American Society For Testing and Materials Standards requires a 3" cushion. With the thermoplastic olefin urethane composition of the invention, only a 2½" thickness is required. For a 10,000 square foot playground, for example, a measurable savings of costs can thus be realized. Whereas urethanes when wet deteriorate over time because the water creates an acid base that attacks the polymer chain, in that the surface holds water for months and does not dry out, the thermoplastic foam urethane of the invention does not suffer that disadvantage. Conversely stated, a 3" thick course base layer of the invention would satisfy the ASTM standards for an 8½' drop whereas a SBR layer would have to be 4" thick. And because the thermoplastic olefin urethane layer of the invention does not present the same polymer chain that is present with urethane itself, it is not subject to the same acid base that is absorbed even with drying out rain water which creates the degradation of the cushion.

An installation for the playground operation according to the invention uses the thermoplastic foam cushion course base layer employed as a combination of a foamed thermoplastic olefin, urethane, polyethylene and/or polypropylene ground into small granules which are mixed in a mixer with a liquid urethane, either aromatic or aliphatic. It is then poured out and leveled on to a substrate, and then hand, troweled smooth. Once it cures enough to walk on, usually the next day, the wear course top layer can be applied. Preferably, the thermoplastic foam cushion course base layer components are ground into granules some 1-3 mm in size—with the underlying substrate sometimes being in the nature of a stone dust or asphalt itself. Although an aromatic urethane is not light stable, when used in this manner under the wear course top layer of the invention, no difference results as the light does not penetrate to the thermoplastic foamed cushion course base layer to begin with. Being that the base particles are held together by a resin, epoxies or acrylics could be used as well.

And with the present invention, any rubber or synthetic turf could be installed over it as the wear top course layer and the advantages and benefits of this part of the invention are thereby enjoyed.

Further, in accordance with the invention, a new and improved wear course top layer is employed for the alternative recreational water park/spray park facility uses. This layer consists of a thermoplastic rubber, part of the Styrene Elastomer family having both the characteristics of rubber and plastic. For these uses, their characteristic of good tear strength, dimensional stability, weather resistance, reusability and recyclability are highly desirable—along with their being colorable, non-shrinkable, of light weight, ultraviolet light resistant—and of major importance, chlorine resistant for its employment at these water recreational locales.

Once the thermoplastic olefin foam cushion course base layer has cured enough to walk on, usually the next day, this wear course top layer of colorable rubber is applied onto the cushion course base layer in about ⅜" to ½" thickness, and then troweled smooth. The resultant safety surface material of the invention in this respect is all seamless, with the binder holding everything together in one continuous carpet-like setting. A hard surface singular mass results, with the moisture in the air finishing the reaction. The result is a totally seamless surface—which could even be used as a base for synthetic turf as at an athletic stadium. And, to install at an existing site—whether it be a playground, a swimming pool or a spray park—all that becomes necessary is to trowel the cushion course base layer down, and when it is cured, layering it over with the thermoplastic rubber wear course top layer—whether the substrate underneath be of a stone base, asphalt or concrete composition.

These features of the invention are illustrated by the Block Diagram of FIG. 1, showing the thermoplastic foamed cushion course base layer combination of thermoplastic olefin, urethane, polyethylene and/or polypropylene 10 ground up into small granules 12 and mixed with a liquid urethane either aromatic or aliphatic. The cushion course base layer is then covered with the thermoplastic rubber 14 that is light stable and mixed with an aliphatic chlorine resistant liquid urethane for water park/spray park use—instead of an EPDM wear course top layer or other thermoplastic vulcanized layer as might be used at a playground although providing less beneficial results there, or with an appropriate artificial surface for soccer, football, or rugby type fields.

In a preferred embodiment of the invention, a recreational facility surfacing material is comprised of a cushion course base layer of 1.3 to 1.5 mm sixed foamed polypropylene granules within an outer skin layer of non-foamed polypropylene in mixture with one of a single or double component Methylene Diphenyl Dissocyanate (MDI) urethane or Hexamethylene Diisocyanate (HDI) urethane; and a wear course top layer of one of a granulated or round Thermoplastic Rubber (TPR), an Ethylene Polypropylene Diene Monomer Rubber (EPDM) and Thermoplastic Vulcanized Rubber (TPV) mixed with one of a Methylene Diphenyl Diisocyanate and Hexamethylene Dissocyanate urethane binder overlying said cushion course base layer; and with at least one of a) said cushion course base layer and said wear course top layer together being of a thickness to correlate and coordinate with an American Society For Testing and Materials (ASTM) standard respecting an impact effect on a surface of a dropping of a prescribed weight from a prescribed height onto said wear course top layer and b) said cushion course base layer being of a resistance to chemical breakdown resulting from a carbolic acid base formation when said cushion course base layer is contacted by chlorinated or ground surface water.

The surfacing material in this embodiment, more specifically, is provided with at least said cushion course base layer and said wear course top layer together being of a thickness to correlate and coordinate with an ASTM Code F1292 Drop Test Standard.

The embodiment in this construction is further provided with at least said wear course top layer being composed of one of said granulated or round TPR, EPDM, or TPV rubbers bound together with one of said MDI and HDI urethane binders mixed together at a rate of 20% urethan binder by weight to rubber, or overlaid by an athletic sports field play synthetic turf grass, and with at least said cushion course base layer being composed of a foamed polypropylene with an outer layer of a non-foamed polypropylene outer skin Thermoplastic Olefin (TO) mixed together with said MDI or HDI urethane binder at a rate of 30% binder by weight to foam.

With at least said cushion course base layer being one of a Thermoplastic Olefin and a foamed propropylene or polyurethane, composed with a non-foamed outer skin, the wear course tope layer is characterized by exhibiting a slip resistance, a weather resistance, and a dimensional stability, is light weight, non-shrinkable and of a meaningful tear strength, and the wear course top layer is ultraviolet light and chlorine resistant.

As will be understood by those skilled in the art, the granulated foamed polypropylene is in pieces ranging in size from 1.3 to 1.5 mm and satisfying the drop height testing of the ASTM F1292 Standard Code. The outer layer of non-foamed polypropylene outer skin thermoplastic olefin serves to withstand deterioration from ground acids which might otherwise satisfy the drop test standards that typically are exhibited with conventionally used Styrene Butylene Rubber (SBR). As to the use of the Methylene Diphenyl Diisocyanate Urethane (MDI) and the Hexanethylene Diisocyanate Urethane (HDI), both urethanes are primarily used indoors, but sometimes in outdoors playground safety services as well, with the MDI being used more frequently due to its cheaper costs compared to the HDI. The MDI, on the other hand, is an aromatic urethane which is not ultraviolet resistant or chlorine resistant—so that in the preferred embodiment of the invention, the HDI urethane is employed as an aliphatic urethane by virtue of its being substantially totally resistant to ultraviolet degradation and exhibits a better resistance to chlorinated water although about 3 times the cost of the MDI urethane. Cushioned bases using the SBR ground tires as characterize present usage, have been found to only pass the ASTM drop test standards an overage of 2 years. With the thermoplastic foamed cushion base of the MDI or HDI Urethane, the past drop testings have been found to be met well over some 3 times as long.

As to the additional uses of the Ethylene Polypropylene Diene Monomer Rubber (EPDM) and Thermoplastic Vulcanized Rubber (TPV), those aromatic rubbers and the chemical makeup occasionally leaves them to chemically break down from ultraviolet degradation, and chlorine attack in water play areas of use. With the specific MDI and preferably HDI urethane binders, the resistance to ultraviolet and chlorine degradation has been determined to perform without measurable degradation over long periods of time—to the extent of 15 years and longer.

While there have been described what are considered to be preferred embodiments of the present invention, it will readily be appreciated by those skilled in the art that modifications can be made without departing from the scope of the teachings herein. Thus, whereas a 2½" thickness of the thermoplastic olefin urethane foamed material will satisfy the same ASTM standards as met by a 3" thickness of the prior art's Styrene Butylene Rubber, different thickness may be required in the future as equipments and/or uses grow in height or activity; similarly, while the thermoplastic rubber wear course top layer for water park usage is presently believed sufficient of a ⅜"-½" layer, so, too, would those thicknesses be increased for more strenuous activities at water park locations other than just running around under spray-type equipment and apparatus. For at least such reasons, therefore, resort should be had to the claims appended hereto for a true understanding of the invention.

I claim:

1. A recreational facility surfacing material comprising:
   a cushion course base layer of foam polypropylene granules within an outer skin layer of non-foamed polypropylene in a mixture with Methylene Diphenyl Diisocyanate (MDI) urethane binder or Hexamethylene Diisocyanate (HDI) urethane binder; and
   a wear course top layer of granulated or round Thermoplastic Rubber (TPR), Ethylene Polypropylene Diene Monomer Rubber (EPDM), or Thermoplastic Vulcanized Rubber (TPV) mixed with one of a Methylene Diphenyl Diisocyanate and Hexamethylene Diisocyanate urethane binder overlying said cushion course base layer.

2. The surfacing material of claim 1 wherein the wear course top layer comprises 20% urethane binder by weight.

3. The surfacing material of claim 1 wherein the cushion course base layer comprises 30% urethane binder by weight.

4. The surfacing material of claim 1 wherein said cushion course base layer is of a thickness of 2½" to 4".

5. The surfacing material of claim 1 wherein said wear course top layer is of a thickness of ⅜" to ½".

6. A seamless surface comprising the surfacing material of claim 1.

7. The surfacing material of claim 1, further comprising a synthetic turf.

8. The surfacing material of claim 1, wherein the cushion course base layer is comprised of 1 to 3 mm granules.

9. The surfacing material of claim 1, wherein the cushion course base layer is comprised of 1.3 mm to 1.5 mm granules.

10. A recreational facility surfacing material comprising:
    a cushion course base layer of foam urethane granules within an outer skin layer of non-foamed urethane in a mixture with Methylene Diphenyl Diisocyanate (MDI) urethane binder or Hexamethylene Diisocyanate (HDI) urethane binder; and
    a wear course top layer of granulated or round Thermoplastic Rubber (TPR), Ethylene Polypropylene Diene Monomer Rubber (EPDM), or Thermoplastic Vulcanized Rubber (TPV) mixed with one of a Methylene Diphenyl Diisocyanate and Hexamethylene Diisocyanate urethane binder overlying said cushion course base layer.

11. A recreational facility surfacing material comprising:
    a cushion course base layer of foam thermoplastic olefin granules within an outer skin layer of non-foamed thermoplastic olefin in a mixture with Methylene Diphenyl Diisocyanate (MDI) urethane binder or Hexamethylene Diisocyanate (HDI) urethane binder; and
    a wear course top layer of granulated or round Thermoplastic Rubber (TPR), Ethylene Polypropylene Diene Monomer Rubber (EPDM), or Thermoplastic Vulcanized Rubber (TPV) mixed with one of a Methylene Diphenyl Diisocyanate and Hexamethylene Diisocyanate urethane binder overlying said cushion course base layer.

12. The surfacing material of claim 11, wherein the foam thermoplastic olefin granules within an outer skin layer of non-foamed thermoplastic olefin are foam polyethylene granules within an outer skin layer of non-foamed polyethylene.

* * * * *